May 17, 1966   J. T. McNANEY   3,252,000
PHOTOSENSITIVE LIGHT FEED-BACK CONTROLLED AMPLIFIER ELEMENT
Filed May 21, 1963

INVENTOR.
Joseph T. McNaney

United States Patent Office 3,252,000
Patented May 17, 1966

3,252,000
PHOTOSENSITIVE LIGHT FEED-BACK
CONTROLLED AMPLIFIER ELEMENT
Joseph T. McNaney, 8548 Boulder Drive, La Mesa, Calif.
Filed May 21, 1963, Ser. No. 282,048
5 Claims. (Cl. 250—227)

The present invention relates to an improved light amplifier and radiation converter means, and more specifically to novel photosensitive light feed-back controlled amplifier elements.

The light amplifier element of this invention utilizes the light conducting efficiencies of small optical fiber means in combination with photoconductor materials to control the refractive properties, and thereby the light transmission characteristics, of certain types of light conducting materials. Electrically polarizable crystals, for example, exhibiting doubly refracting properties, will be used intermediate an optical polarizer and an optical analyzer as an electrostatically controlled light gate medium. Materials exhibiting double refractive properties are generally known as Kerr effect materials, since it was in 1875 that John Kerr discovered such an electrooptic effect in glass when subjected to a strong electrostatic field.

I utilize the basic element of this invention to block the admission of a relatively intense beam of light to an optical fiber from one direction unless a relatively low intensity beam is first admitted to the fiber from another direction. Although the low intensity beam appears only momentarily it will act as a trigger for admitting the high intensity beam to the fiber, through the light gate medium. Once admitted to the fiber, the light transmission properties of the light gate medium will reach a maximum, and remain so until either the high intensity beam or the electrical power to the element is turned OFF. The basic element of this invention may, therefore, be used as a photosensitive light beam switch, or, a photosensitive electrical power switch, in response to momentary low light level input commands.

As hereinafter set forth, the response characteristics of the photoconductor material of the invention will permit the amplifier element to provide output signals, either in the form of useful light levels or electrical energy, as a function of the value of radiant energy input signals. The value of such output signals may, therefore, be made proportional to the value of the input signals.

In addition to the objects and advantages aforestated, it is an object of this invention to provide a light amplifier element which can be made extremely small, which is simple in construction, positive in operation, and trouble-free in continued use.

It is another object of this invention to provide a light amplifier element in the form of a small optical fiber supported photosensitive element as a basic constituent of a panel array in combination with a doubly refracting light gate medium for amplifying, or converting, low level light images.

It is, therefore, an object of this invention to provide a basic element which lends itself to fabricating panel arrays for converting images within one range of wavelengths to images of an entirely different range of wavelengths.

It is another object of this invention to provide a light amplifier element which lends itself to the construction of apparatus for transforming transitory light wave information into less temporary forms of visual information.

Other objects and advantages will appear hereinafter as a description of the invention proceeds.

The novel features that are considered characteristic of this invention are set forth with particularity in the appended claims. The invention itself, both as to its organization and method of operation, as well as additional objects and advantages, will best be understood from the following description when read in conjunction with the accompanying drawing in which:

Figure 1:
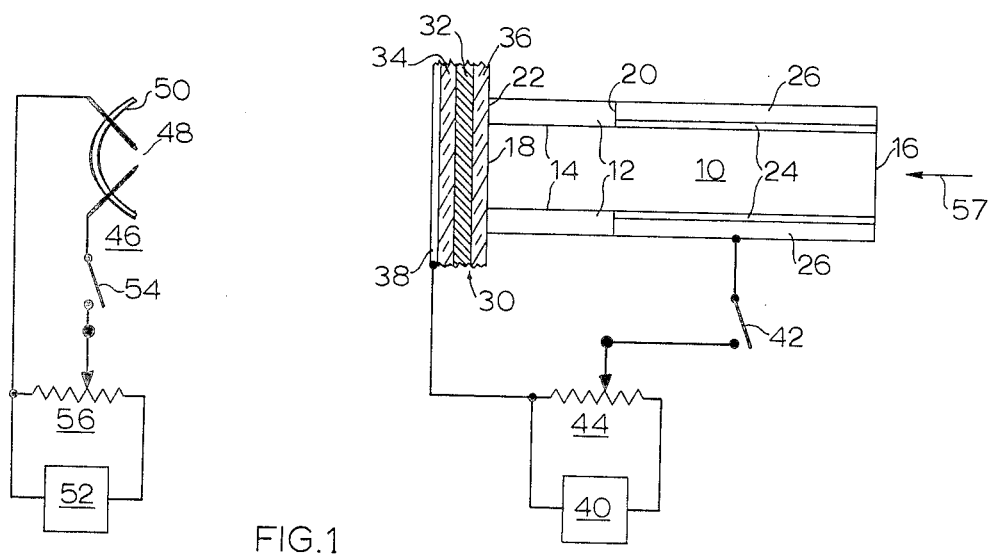
FIGURE 1 is a sectional view of a unitary element embodying the basis concepts of the invention and included in a system embodiment of the invention.

Referring to the invention as illustrated in FIGURE 1, the photosensitive light amplifier element utilizes an optical fiber core 10 as the principal support means of the various other parts of the invention, which includes a layer 12 of photoconductor material, adapted to receive light being conducted through the core 10. The core 10, therefore, is of a light conducting material having a longitudinal dimension and a cross-section which may be round, square, or of any desired configuration, having an outer surface 14 generally along its longitudinal dimension, and first 16 and second 18 transverse ends. The photoconductor layer 12 is disposed upon the outer surface 14, adjacent the second end 18, having first 20 and second 22 terminals.

A jacket 24 of light conducting material is disposed upon and intimately joined with the outer surface 14 of the core 10, extending from the first end 16 to the first terminal 20 of the layer 12. The core 10 is designed to have a predetermined index of refraction in relation to a lower index of refraction of the jacket 24. The core 10 and jacket 24 assembly is generally known and understood in the arts as fiber optics, or, as a means of transmitting radiant energy through fiber-like conductors, made of glass, plastics, or the like, which can be drawn down to cross-sectional dimensions of less than 25 microns.

The core 10 and jacket 24 assembly is drawn together to provide an extremely important fire-polished, contamination-free, interface at and along the juncture of the core and jacket. Under these conditions, a jacket 24 of a lower index than the core 10 will function as a very efficient reflector of radiation within, and beyond, the visible spectrum. The jacket 24 thickness, of course, must be taken into consideration since wave energy is required to penetrate the jacket 24 slightly more than a wavelength from the interface if it is to function as a reflector. The core 10 may have, for example, a cross-sectional dimension of 20 microns, or more, and the jacket 24 may have a wall thickness from 1 to 10 microns, depending upon the wavelength of radiation such an assembly is designed to handle.

The jacket 24 has been removed from a predetermined portion of the core 10 to permit the photoconductor layer 12 to be intimately joined with the outer surface 14 of the core 10 and, thereby, be able to receive radiation directly from the core 10 without having to penetrate the jacket 24. The jacket 24 removal from the core 10 may be accomplished by means of any of several well known chemical processes.

Photoconductor materials, of which the layer 12 may be composed, will be selected from a number of well known solids such as lead selenide, lead sulfide, selenium, germanium, silicon, cadmium sulphide, or like materials, or combinations of such materials, either in their pure or modified state. When deposited on the outer surface 14 of the core 10, the layer 12 will take the form of a tubular photosensitive means, surrounding the core 10, and presenting first 20 and second 22 terminals. The layer 12 may also be designed to meet the requirements of the invention even though it does not entirely surround the core 10.

An electrode means 26 is provided, and is of an electrically conducting material that may be disposed upon the outer surface of the jacket 24, and in electrical contact with the first terminal of the layer 12 of photoconductor material. This electrical conducting material 26 will also be used as a binder means for holding together a panel array of the amplifier elements of this invention. Insofar as each unitary element is concerned, however, the material 26 will take the form of a tubular electrode means 26, for the purpose of extending the influence of a voltage, connected thereto, to the first terminal 20 of the photoconductor layer 12.

Adjacent the second terminal 22 of the layer 12, and also adjacent the second end 18 of the core 10, and supported thereby, there is a doubly refracting light gate means 30. This light gate means is coupled electrically to the second terminal 22 of the layer 12, and is coupled optically to the second end 18 of the core 10. The means 30 comprises a layer 32 of Kerr effect material, intermediate a polarizer 34 and an analyzer 36. Intimately joined with the polarizer 34 there is a layer 38 of light transparent electrically conductive material, whereby, the influence of a voltage from a source 40 may be impressed across the light gate means 30 intermediate the conductive layer 38 and the second terminal 22 of the layer 12 of photoconductive material. A voltage from the source 40 will be connected between the layer 38 and the electrode means 26 through an ON-OFF switch 42 and a potentiometer 44. The switch 42 and the potentiometer 44 may be used to control the level of voltage being applied to the light gate means 30, in conjunction with the variable resistance effects of the photoconductor layer 12 in response to light exposed thereto. Voltage extended to the second terminal 22, and across the light gate means 30, will modify the optical properties of the Kerr effect material 32 accordingly.

A light source 46 will be used to provide a collimated light beam which is projected through the polarizer 34 and onto the Kerr effect layer 32. The light source 46 is illustrated as containing arc electrodes 48 and a reflector 50. Voltage from a source 52 is connected between the electrodes 48 through an ON-OFF switch 54 and a potentiometer 56, whereby the intensity and ON-OFF characteristic of the light beam may be controlled and thereby provide output information proportional to the value of input information. The doubly refractive, or Kerr effect, material 32 may include such electrically polarizable materials as barium titanate, lead zirconate, nitrobenzol, bisulfide of carbon, bentonite colloids, or, other forms of crystals or like materials. Upon reaching the Kerr effect material 32, the collimated light beam from the source 46 will have been polarized in relation to the analyzer 36 which is set at extinction. The analyzer 36, therefore, will be displaced 90° with respect to the placement of the polarizer 34. Under the influence of an electrical field condition, however, the Kerr effect material 32 will become doubly refracting and light therethrough will be decomposed into elliptically polarized light and, thereby, able to pass through the analyzer 36. Upon doing so, the light will enter the core 10 through the second end 18 and illuminate the photoconductor layer 12. The double refractive properties of the Kerr effect material 32 will be made to vary as a function of the voltage extended from the first terminal 20 to the second terminal 22 of the photoconductor layer 12, upon the exposure of light thereto.

When placed in operation, a primary source of light, in the form of input information, will be exposed to the first end 16 of the core 10. Light from the source 46 may be identified as a secondary source, or light power supply. The secondary source of light to the photoconductor layer 12 will be under the control of the primary light entering the core 10. An adjustable voltage will be obtained from across the potentiometer means 44 and applied to the amplifier element, between the electrodes 26 and 38, through the switch means 42. The longitudinal dimension of the photoconductor layer 12, between the first and second terminals 20 and 22, will be designed to hold back a relatively high voltage level when in a dark state, by reason of its length. The dark state resistance of the layer 12, being substantially below infinite, will of course allow a relatively low voltage to appear across the light gate means 30. But the effect of such voltage on the light gate means 30 will be just below the point at which circular polarization becomes effective in passing light therethrough. The design of the amplifier element, and the adjustment of voltages thereto, are such that the element will remain in an "OFF" condition until light from a primary source initiates the action necessary to open the light gate means 30 for the passage of secondary light to the core 10 and layer 12. Once such action has been initiated, secondary light will add further to the lowering of the layer 12 resistance until the amplifier element reaches a fully "ON" condition. Fully, of course, being a measure of the maximum operating conditions of the amplifier element, and also the light available from the secondary source 46. The "ON" state of the element will persist until the voltage or the secondary light has been interrupted.

The switch means 54 is provided to control the fully "ON" state, or the maximum secondary light output conditions of the amplifier element, following the inititaing action of a primary light source. The exemplary switch means 54, which is not to be limited to the particular form of switch illustrated, is for the purpose of controlling the ON and OFF periods of the secondary light source 46, and, thereby, the light amplifying characteristics of the element. In doing so, the time constant of the electrical circuit means, including the photoconductor layer 12 response and the Kerr effect material response of the light gate means 30, will be considered. Since the actions following the exposure of primary light in the general direction of the arrow 57 are not instantaneous, the ON period of the secondary light source will be a factor in controlling the light amplifying characteristics of the element. If, for example, the secondary source 46 ON period has been set at 0.001 second, and the time constant of the electrical circuit means is such that the ON period of the second source 46 would have to remain ON for 0.01 second before the light gate means 30 has reached its predetermined openness, then the amplifier element will have attained but a fraction of its fully "ON" state capability. For a given primary light input, therefore, secondary light being coupled to the core 10 will be made a function of the ON period of the secondary light source 46. Also, if the secondary light ON period is set for 0.001 second, secondary light being coupled to the core 10 will be a function of variations of primary light in the direction of the arrow 57.

Figure 2:
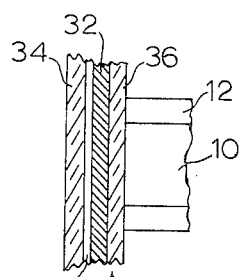
FIGURE 2 shows a modified version of the light gate means as illustrated in FIGURE 1.
Figure 3:
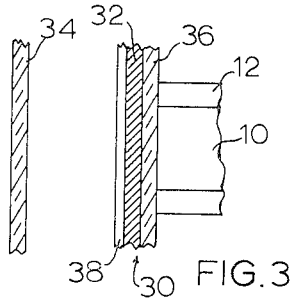
FIGURE 3 shows another modification of the light gate means as illustrated in FIGURE 1.

Referring now to FIGURE 2, the layer 38 of light transparent electrically conductive material, such as NESA glass, for example, is interposed between the Kerr effect material 32 and the polarizer 34. And as illustrated in FIGURE 3, the polarizer 34 may be spaced apart from the transparent conductor 38. These modified versions of the light gate means 30 may be utilized in the embodiment of FIGURE 1, instead of the light gate means 30 as illustrated therein, if desired. The operating conditions, as hereinbefore set forth in connection with the FIGURE 1 embodiment, will remain substantially unchanged.

Figure 4:
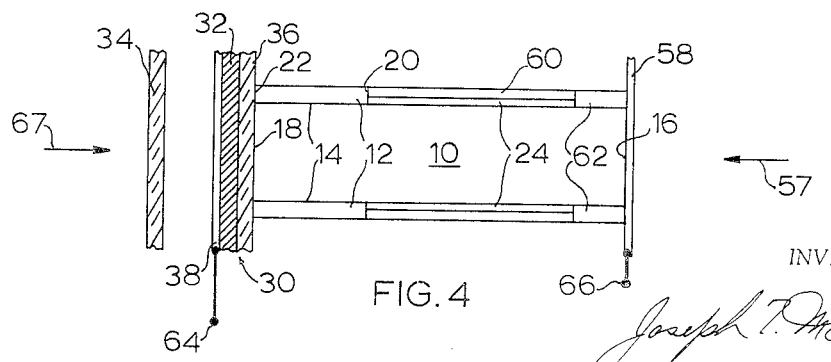
FIGURE 4 is a sectional view of a unitary element of another embodiment of the invention.

A unitary element of still another embodiment of the invention is shown in FIGURE 4. The core 10 is used to support the layer 12 of photoconductor material adjacent the second transverse end 18, and operatively coupled with a light gate means 30, as described in connection with the embodiment of FIGURE 1. There is, however, a second layer 62 of photoconductor material intimately joined with the outer surface 14 of the core 10, adjacent the first transverse end 16. A transparent electrically conductive layer 58, such as NESA glass, for example, is disposed upon and intimately joined with the first end 16 and operatively connected to the layer 62. Another electrode means 60 is disposed upon the outer surface of a light conducting jacket 24 and interconnecting the first and second photoconductor layers 12 and 62. The electrode means 38 is provided with a terminal 64 and the electrode 58 is provided with a terminal 66, whereby, a first polarity of a voltage may be connected to the electrode means 38 while a second polarity of the voltage may be connected to the electrode means 58.

When in operation, primary light will be exposed to the first end 16 of the core 10, in the general direction of the arrow 57, secondary light will be exposed to the light gate means 30 in the general direction of the arrow 67, and the voltage may be derived from a source 40 as described in connection with the FIGURE 1 embodiment. The secondary light may be obtained from a source 46 and system similar to that shown in FIGURE 1. In this embodiment the secondary photoconductor layer 62 is adapted to extend the second voltage polarity on the terminal 66 to the first terminal 20 of the layer 12 through the eletcrode 60, upon the exposure of radiation to the layer 62. The second layer 62 may be sensitive to infrared, for example, being exposed thereto in the direction of the arrow 57. The illuminated resistance state of the layer 62 will allow the voltage effect across the light gate means 30 to be increased to the point at which circular polarization becomes effective in passing secondary light therethrough. The amplifier element will then be changed from an "OFF" condition to an "ON" condition by means of infrared radiation, and since the secondary radiation in the direction of the arrow 67 may be within the visible spectrum, the invention may be utilized as a radiation converter means.

Although I show the secondary photoconductor layer 62 disposed upon the outer surface 14 of the core 10, the jacket 24 may extend to the first end 16 and if thin enough the jacket 24 may be intermediate the layer 62 and the core 10. If, for example, the jacket thickness is two microns, it will be thin enough for infrared to reach the layer 62, and of a thickness great enough to reflect secondary light, within the visible spectrum, through the longitudinal dimension of the core 10, from the light gate means 30, and to the first end 16 for viewing purposes.

Although I have limited myself to the showing of certain embodiments of the invention, it should be understood by those skilled in the arts that the invention is not to be limited in this regard since many of the other embodiments embracing the general principles and constructions hereinbefore set forth may be utilized, and still be within the ambit of the present invention.

The particular embodiments of the invention illustrated and described herein are illustrative only, and the invention includes such other modifications and equivalents as may readily appear to those skilled in the arts, and within the scope of the appended claims.

I claim:

1. A photosensitive light feed-back controlled amplifier comprising:
   (a) photoconductor material presenting at least two terminals;
   (b) optical fiber means, having first and second ends, for supporting said material and conducting light, entering said first end from a primary source of light, through said fiber means to said material;
   (c) a secondary source of light;
   (d) a doubly refracting light gate means presenting a surface and intimately joined thereby to one of said terminals, and optically coupled through said fiber means to said material;
   (e) said light gate means having the ability to pass light therethrough when under the influence of an electrical potential, and having the ability to prevent the passage of light therethrough in the absence of said influence, being positioned intermediate said secondary source of light and the second end of said fiber means for controlling the exposure of light from said secondary source to said material; and
   (f) means for controlling the ability of said light gate means to pass light, from said secondary source, therethrough to said fiber means and to said material upon the conducting of light, from said primary source, through said first end to said material.

2. A photosensitive light feed-back controlled amplifier comprising:
   (a) photoconductor material presenting first and second terminals;
   (b) a doubly refracting light gate means presenting first and second surfaces and said second surface intimately joined to said second terminal;
   (c) a primary source of light with means for exposing said material to light from said primary source;
   (d) a secondary source of light;
   (e) said light gate means having the ability to pass light therethrough when under the influence of an electrical potential, and having the ability to prevent the passage of light therethrough in the absence of said influence, and being positioned intermediate said secondary source of light and said material so as to prevent the exposure of light to said material from said secondary source in the absence of said influence;
   (f) a source of electrical potential with means for connecting said potential between said first terminal and said first surface and thereby in series with said material and said light gate means;
   (g) said potential being extended across said light gate means upon the exposure of said material to light from said primary source; and
   (h) light from said secondary source being exposed to said material, through said light gate means, following the extension of said potential across said light gate means.

3. Means for utilization in a photosensitive light feed-back controlled amplifier element comprising:
   (a) a doubly refracting light gate means having the ability to pass light therethrough, from a source of light independent thereof, when under the influence of an electrical potential, and having the ability to prevent the passage of said light in the absence of said influence;
   (b) a layer of photoconductor material having at least two terminals;
   (c) said light gate means presenting a surface and intimately joined thereby to one of said terminals;
   (d) first light conductor means having first and second ends, a predetermined index of refraction, and intimately joined with said layer and said surface adjacent said second end for conducting light to said layer after passing through said light gate means;
   (e) second light conductor means having an index of refraction less than said predetermined index for controlling the reflection of light from said first end, through said first light conductor means, and to said layer; and
   (f) means for applying said influence to said light gate means following said reflection of light to said layer from said first end so as to cause the passage of light, from said source, therethrough to said second end and to said layer.

4. Means for utilization in a photosensitive light feed-back controlled amplifier element comprising:
   (a) a doubly refracting light gate means presenting first and second surfaces;

(b) a layer of photoconductor material having first and second terminals and said second terminal intimately joined to said second surface;

(c) said light gate means having the ability to pass light being directed at said first surface therethrough to said second surface when under the influence of an electrical potential, and having the ability to prevent the passage of said light in the absence of said influence;

(d) means for connecting an electrical potential between said first terminal and said first surface;

(e) first light conductor means having first and second ends, a predetermined index of refraction, and intimately joined with said layer and said second surface, adjacent said second end, for conducting light to said layer after passing through said light gate means;

(f) second light conductor means having an index of refraction less than said predetermined index for controlling the reflection of light from said first end, through said first light conductor means, and to said layers; and (g) means for extending the influence of said electrical potential across said light gate means upon said reflection of light to said layer and thereby establish the ability of said light gate means to pass light, being directed at said first surface, therethrough to said second end and to said layer.

5. A photosensitive light feed-back controlled amplifier comprising:
(a) a doubly refracting light gate means presenting first and second surfaces;
(b) photoconductor material presenting first and second terminals with means for interconnecting the second terminal thereof with the second surface of said light gate means;
(c) a source of electrical potential with means for connecting said source between said first terminal and said first surface;
(d) means for exposing light directly from a primary source of light to said material and thereby extending said potential through said material and between said first and second surfaces;
(e) a secondary source of light with means for controlling the intensity of said light therefrom independent of said potential and said material; and
(f) means for passing light from said secondary source through said light gate means to said material upon the exposure of light from said primary source to said material.

References Cited by the Examiner

UNITED STATES PATENTS

| | | | |
|---|---|---|---|
| 1,642,011 | 9/1927 | Chubb | 88—61 |
| 1,879,138 | 9/1932 | Eccles et al. | 88—61 |
| 2,971,091 | 2/1961 | Ball | 88—61 |
| 2,974,233 | 3/1961 | Loebner | 250—213 |
| 3,030,515 | 4/1962 | Hanlet | 250—213 |
| 3,039,005 | 6/1962 | O'Connell et al. | 250—213 |

OTHER REFERENCES

Darling et al.: "Solid State Storage Light Intensifier Panel," RCA Technical Notes No. 368, June, 1960.

RALPH G. NILSON, *Primary Examiner.*

E. STRICKLAND, W. STOLWEIN, *Assistant Examiners.*